United States Patent
Friant et al.

(10) Patent No.: US 10,169,695 B2
(45) Date of Patent: Jan. 1, 2019

(54) REMOVABLE MARKING ELEMENT WITH ACCESS CREDENTIALS

(71) Applicant: VISA INTERNATIONAL SERVICE ASSOCIATION, San Francisco, CA (US)

(72) Inventors: Jillian Friant, Foster City, CA (US); Angela Moore, Willoughby (AU)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 201 days.

(21) Appl. No.: 15/192,656

(22) Filed: Jun. 24, 2016

(65) Prior Publication Data
US 2017/0372185 A1   Dec. 28, 2017

(51) Int. Cl.
| | |
|---|---|
| *G06K 19/07* | (2006.01) |
| *G06K 7/00* | (2006.01) |
| *G06K 19/06* | (2006.01) |
| *G06K 19/077* | (2006.01) |
| *G06Q 20/40* | (2012.01) |
| *G07C 9/00* | (2006.01) |
| *H04L 29/06* | (2006.01) |

(Continued)

(52) U.S. Cl.
CPC ....... *G06K 19/0727* (2013.01); *G06K 7/0004* (2013.01); *G06K 19/06028* (2013.01); *G06K 19/06187* (2013.01); *G06K 19/0776* (2013.01); *G06Q 20/32* (2013.01); *G06Q 20/3276* (2013.01); *G06Q 20/3278* (2013.01); *G06Q 20/40145* (2013.01); *G07C 9/00007* (2013.01); *G07C 9/00103* (2013.01); *H04L 63/08* (2013.01); *H04W 12/06* (2013.01); *H04W 12/08* (2013.01); *G07B 15/00* (2013.01); *H04W 4/12* (2013.01); *H04W 4/80* (2018.02)

(58) Field of Classification Search
CPC ......... G06K 19/0727; G06K 19/06028; G06K 19/06187; G06K 19/0776; G06K 7/0004; G06Q 20/32; G06Q 20/40145; G07C 9/00007; H04L 63/08; H04W 4/80; H04W 4/008
See application file for complete search history.

(56) References Cited

U.S. PATENT DOCUMENTS

| | | | |
|---|---|---|---|
| 5,578,353 | A | 11/1996 | Drew, III |
| 6,264,786 | B1 | 7/2001 | Cromett |
| 2009/0276356 | A1 | 11/2009 | Scipioni et al. |
| 2012/0223137 | A1 | 9/2012 | Heeter |

(Continued)

OTHER PUBLICATIONS

PCT/US2017/033336, "International Search Report and Written Opinion", dated Jul. 25, 2017, 16 pages.

(Continued)

*Primary Examiner* — Matthew Smithers
*Assistant Examiner* — Alexander R Lapian
(74) *Attorney, Agent, or Firm* — Kilpatrick Townsend & Stockton LLP

(57) ABSTRACT

A method and system for transacting with a removable marking element is disclosed. A removable marking element including credentials can be associated with an account. A user can activate and manage the account via a mobile device. The mobile device can access the account by providing a product identifier. A product identifier may be provided in removable marking element packaging. For example, the product identifier may be encoded in a machine readable code on the packaging.

22 Claims, 8 Drawing Sheets

(51) Int. Cl.
*G06Q 20/32* (2012.01)
*H04W 12/06* (2009.01)
*H04W 12/08* (2009.01)
*H04W 4/80* (2018.01)
*H04W 4/12* (2009.01)
*G07B 15/00* (2011.01)

(56) References Cited

U.S. PATENT DOCUMENTS

| 2014/0164228 | A1  | 6/2014  | Pathak |
| 2015/0046202 | A1  | 2/2015  | Hunt |
| 2015/0294312 | A1* | 10/2015 | Kendrick ............... G06Q 20/40 705/44 |
| 2015/0310446 | A1* | 10/2015 | Tuchman ............. G06Q 30/016 705/304 |
| 2017/0352090 | A1* | 12/2017 | Liu .................... G06Q 30/0635 |

OTHER PUBLICATIONS

Unknown, "'Tech Tats' Are Temporary Tattoos for the Casual Biohacker", Available Online at:—https://motherboard.vice.com/en_us/article/pgkygg/tech-tats-are-temporary-tattoos-for-the-casual-biohacker, Nov. 23, 2015, 3 pages.

Unknown, "How to use your Incentive Award Card", Available Online at:—http://www.edenred.co.uk/spend-incentive-award-card#.WYKo_q7vNQI, Dec. 12, 2013, 3 pages.

Whitman, Ryan, "Temporary Tech Tattoos Could Monitor Your Health, Pay for Your Coffee", Geek, HostGator.com, http://www.geek.com/chips/temporary-tech-tattoos-could-monitor-your-health-pay-for-your-coffee-1640423/, Nov. 27, 2015, 2 pages.

Nguyen, Clinton, "'Tech Tats' Are Temporary Tattoos for the Casual Biohacker", Motherboard, http://motherboard.vice.com/read/tech-tats-are-temporary-tattoos-for-the-casual-biohacker, Nov. 23, 2015, 7 pages.

\* cited by examiner

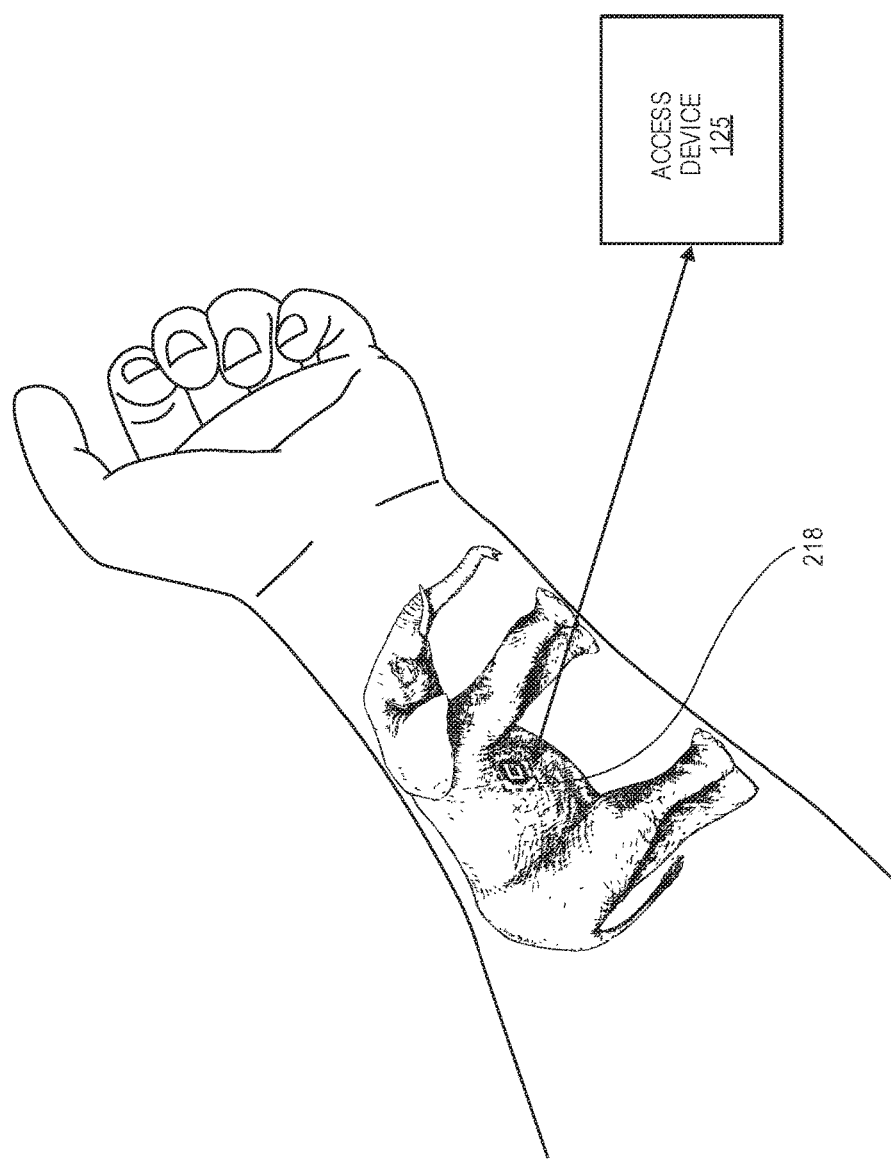

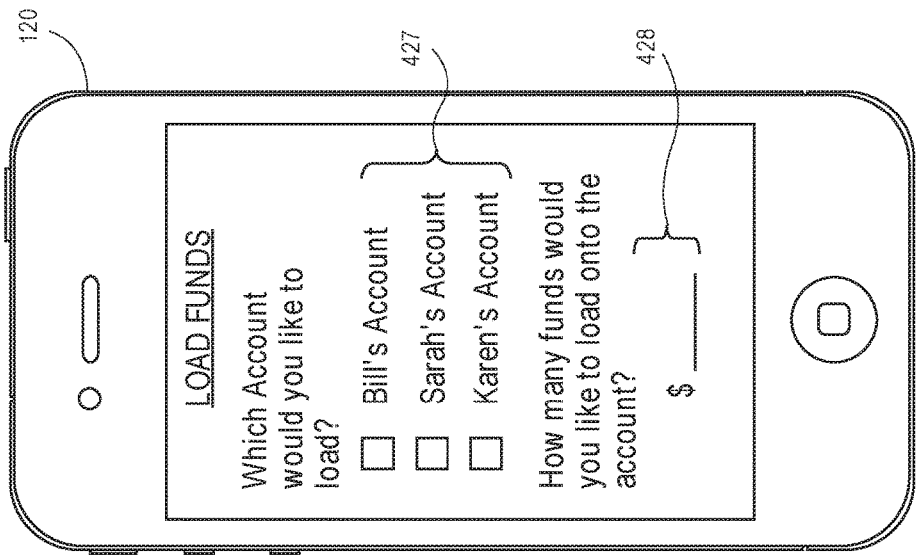
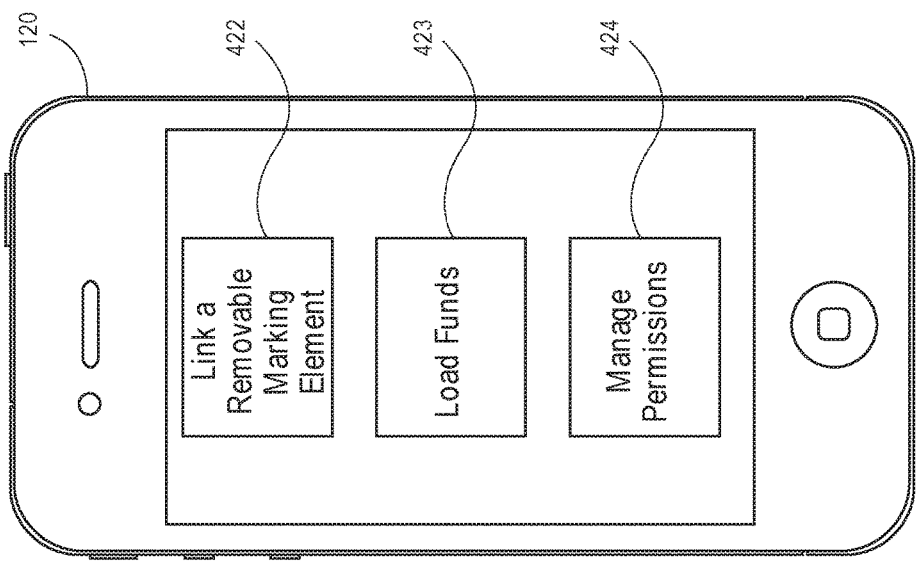
FIG. 4B
FIG. 4A

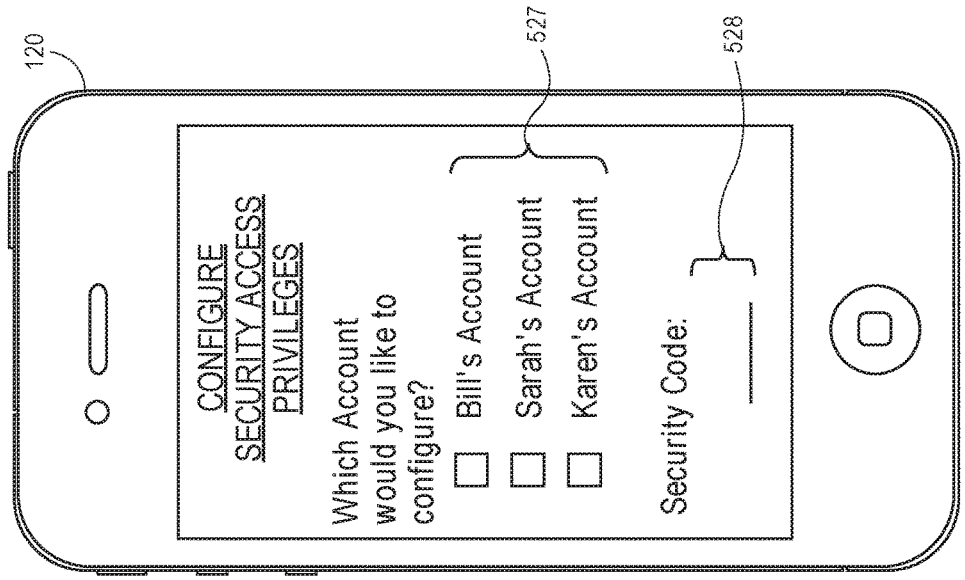
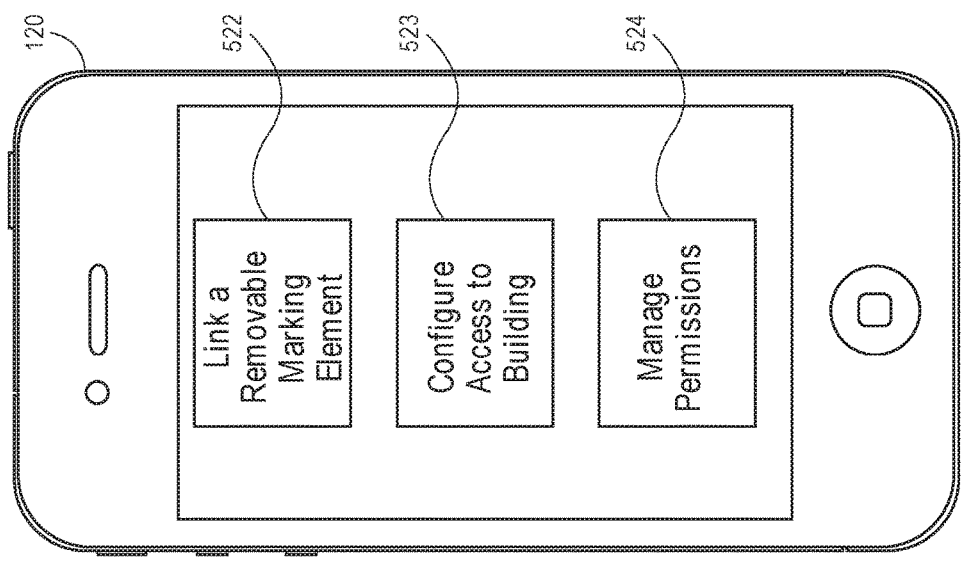

REMOVABLE MARKING ELEMENT WITH ACCESS CREDENTIALS

CROSS REFERENCE TO RELATED APPLICATIONS

None

BACKGROUND

People often carry a number of items. For example, a person may carry a phone, a driver's license, an access badge, an insurance card, a wallet, and a number of other devices and cards with them. Carrying these items can be inconvenient and uncomfortable, and the items can be subject to loss or theft.

In some situations, a person may not want to or be allowed to carry certain items, though the functionality of the items may still be desired. For example, people attending an event (e.g., a concert) may not be allowed to bring bags into the event area. Accordingly, attendees may not have a bag for holding access tickets, wallets, driver's licenses, etc. However, an event attendee may still want to use a ticket for entry, a driver's license for providing their age, and/or a credit card for purchases during the event.

Embodiments of the invention address these and other problems individually and collectively.

SUMMARY

One embodiment of the invention is directed to a method. The method comprises obtaining, by a mobile device, a product identifier by obtaining a machine readable code associated with a removable marking element adapted to adhere to skin. The removable marking element includes an integrated circuit that is configured to transmit a first access credential associated with a first account over a wireless communication channel to an access device during a transaction. The method also comprises transmitting, by the mobile device, to a server computer, a message comprising the product identifier, a value, and a second access credential associated with a second account. The server computer identifies the first account based on the product identifier, and the server computer loads the first account with the value from the second account.

Another embodiment of the invention is directed to a mobile device configured to perform the above-described method.

Another embodiment of the invention is directed to a method comprising receiving, by a server computer, from a mobile device, a message including a value, a second access credential associated with a second account, and a product identifier associated with a removable marking element adapted to adhere to skin. The mobile device obtained the product identifier by obtaining a machine readable code associated with a removable marking element. The removable marking element includes an integrated circuit that is configured to transmit a first access credential associated with a first account over a wireless communication channel to an access device during a transaction. The method further comprises identifying the first account based on the product identifier, and loading the first account with the value from the second account.

Another embodiment of the invention is directed to a server computer configured to perform the above-described method.

Another embodiment of the invention is directed to a method comprising capturing, by a user via a mobile device, a product identifier associated with a removable marking element adapted to adhere to skin. The method also includes providing a value and a second access credential to the mobile device. The mobile device sends the product identifier, the value, and the second access credential to a server computer. The server computer identifies a first account associated with the product identifier, and the server computer loads the first account with the value from the second account. The method further includes applying, by the user, the removable marking element to the user's body; and presenting, by the user, the product identifier to an access device for a transaction. The access device obtains a first access credential from the removable marking element, and the access device sends the first access credential to the server computer. The server computer authorizes the transaction based on the first account. The method also comprises receiving an indication that the transaction is authorized.

Further details regarding embodiments of the invention can be found in the Detailed Description and the Figures.

BRIEF DESCRIPTION OF THE DRAWINGS

FIG. 3 shows an example of a removable marking element applied to a user's skin, according to an embodiment of the invention.

FIGS. 4A-4B show examples of account management features on a mobile device, according to an embodiment of the invention.

FIGS. 5A-5B show further examples of account management features on a mobile device, according to an embodiment of the invention.

DETAILED DESCRIPTION

Figure 1:
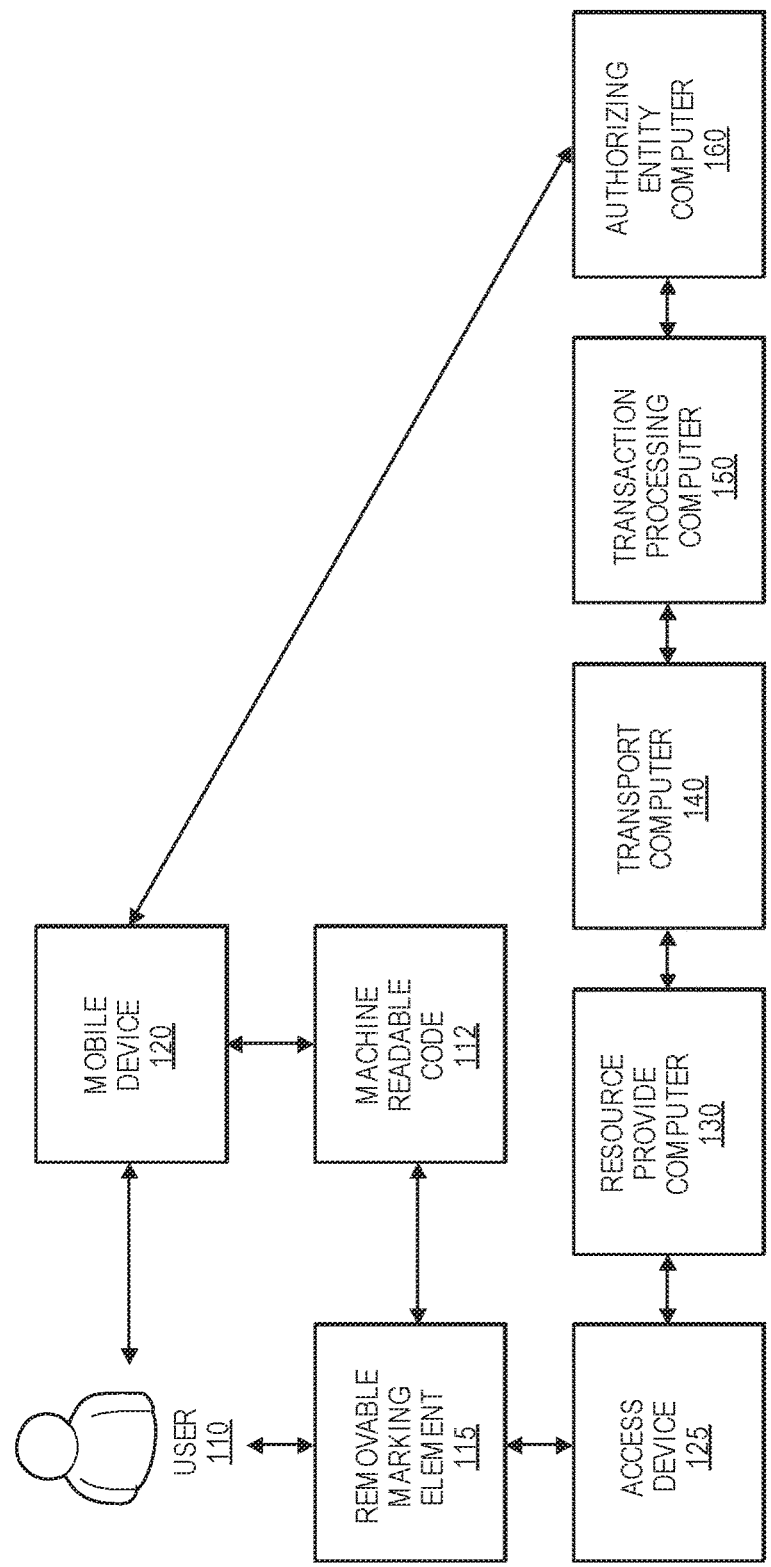
FIG. 1 shows a block diagram of a system, according to an embodiment of the invention.

Embodiments of the present invention are directed to a removable marking element that can be used for transactions. For example, a removable marking element can be associated with an account at an authorizing entity. The removable marking element can be presented to an access device for a transaction, and the transaction can be authorized based on the removable marking element account (e.g., at the authorizing entity).

In some embodiments, the removable marking element can include credentials. For example the removable marking element can include an access credential that can be used to identify the removable marking element account.

In some embodiments, the removable marking element can include an embedded or attached microchip (or any other suitable type of integrated circuit), and the microchip may store the access credential. The microchip may be able to transmit the access credential to an access device through contact or contactless transmission (e.g., NFC, IR, Bluetooth®, etc.).

In some embodiments, the removable marking element can include a marking such as a steganographic image. For example, the access credential may be encoded into a steganographic image. An access device (or another suitable computer) may be able to decode the steganographic image to obtain the access credential.

Accordingly, embodiments of the invention allow a removable marking element to be used instead of typical transaction devices (e.g., access cards, payment devices, personal identification cards, etc.). This advantageously increases user convenience and device security. Instead of carrying one or more cards or other devices, a user can simply attach a removable marking element to their body (e.g., forearm). For example, the removable marking element can adhere to the user's skin. A typical transaction device can be lost or stolen, but a removable marking element may not be left behind or stolen since the removable marking element can be attached to the user's body. Additionally, a removable marking element can beneficially serve as a transaction device for a child that normally does not have or cannot be trusted with a typical transaction device. A parent can apply the removable marking element to the child's body, and can manage the removable marking element account on behalf of the child (e.g., via a mobile device).

In some embodiments, a user may use a mobile device to activate, fund, link, and/or manage a removable marking element account. For example, the user may contact an authorizing entity (also referred to as a removable marking element account issuer) via the mobile device and request that the removable marking element account be activated. The user may also provide funds, access codes, login codes, security information, or any other suitable transaction-related information for the removable marking element account. For example, the user (via the mobile device) may provide a certain amount of funds for the removable marking element account, or may link the removable marking element account with a separate payment account. The mobile device may also serve as a tool for managing permissions, restrictions, and any other suitable controls and parameters for the removable marking element account.

Accordingly, embodiments provide a convenient way for users to manage their removable markings. A removable marking element may not have a user interface for account management, but a mobile device can serve as an intermediary between the removable marking element and the removable marking element account (e.g., at the authorizing entity).

In some embodiments, a product identifier may be provided for initially accessing a removable marking element account (e.g., for funding the account or linking a mobile device with the removable marking element). For example, a product identifier may be printed in the form of a machine readable code (e.g., a barcode) on packaging for the removable marking element. When a user obtains the removable marking element, the user may scan the machine readable code with a mobile device. The mobile device may then transmit the product identifier to the authorizing entity. As a result, the authorizing entity can identify the removable marking element account based on the product identifier, and can allow the mobile device to access the removable marking element account.

Accordingly, embodiments provide a convenient way to activate and link a removable marking element so that it can be used to conduct a transaction. In some embodiments, a user may be able to scan (or otherwise obtain) a machine readable code provided with the removable marking element, and then have immediate access to the removable marking element account (e.g., for activation, funding, management, etc.). Thus, the user can access and manage the removable marking element account even if the removable marking element does not display an account identifier.

In other embodiments, instead of machine readable code, an alphanumeric product identifier can be printed on the packaging. Additionally, a machine readable code or product identifier can be mailed or messaged to the user after obtaining the removable marking element (e.g., instead of printing the product identifier on the packaging).

In some embodiments, the product identifier may serve to identify the removable marking element account (e.g., for account management), but the product identifier may not be used as authorization to pay for transactions. In some embodiments, instead of including a product identifier, a transactable access credential may be provided to the user for initial account linking (e.g., the access credential may be printed as a machine readable code on the removable marking element packaging).

Embodiments of the invention allow the removable marking element and removable marking element account to be used for any suitable type of transaction. For example, the removable marking element account can function as a payment account, and the removable marking element can be used for payment transactions. Additionally, the removable marking element account can serve as an access account, and the removable marking element can be used for access transactions. For example, the removable marking element can be used for access into a restricted area (e.g., an event, a building, etc.) or access to restricted information (e.g., a private computer, a private database, etc.). As another example, the removable marking element account can serve as an identity account, and the removable marking element can be used for identity verification. For example, the removable marking element can be used as identification (e.g., a driver's license or passport) when passing through a security checkpoint (e.g., at an airport).

For the sake of description, the removable marking element account will be primarily described as a payment account herein. However, as described above, the removable marking element account may serve as any other suitable type of account.

Prior to discussing specific embodiments of the invention, some terms may be described in detail.

A "removable marking element" may include a marking that is removable. In some embodiments, a removable marking element can include an image on a person's skin. A removable marking element can fade and disappear within a certain amount of time (e.g., 2 hours, 1 day, 3 days, 1 week, 2 weeks, 1 month, or any other suitable amount of time). A removable marking element may also be removed by washing. A removable marking element may attach to the surface of a person's skin, and a removable marking element can be applied as an adhesive, drawn, painted, or airbrushed as a form of body painting. In some embodiments, a removable marking element can be plastic that is transferred to the skin from paper or cardboard (e.g. by applying a wet cloth). Examples of a removable marking element include a temporary tattoo, a sticker, body painting, makeup, and any other suitable material that can be applied to a user's body and then removed.

In some embodiments, a removable marking element can include a data storage medium, such as an electronic or magnetic data storage medium. For example, a removable marking element can include an embedded or attached integrated circuit (e.g., a microchip).

A "temporary tattoo" can include an image-bearing laminate. The laminate can be attached to human skin. The laminate may include a printable release coating on a backing sheet and an image printed with ink on the printable release coating. A film that may be impenetrable to the ink can be attached to the image, and can include adhesive on an exposed face of the film. The coating, image and film may be attached to human skin by pressing the combination of the coating, image, film and adhesive on skin (and removing a backing sheet of the release sheet from the film/image/coating).

A "removable marking element account" may include a record associated with a removable marking element at an account provider. A removable marking element account may also be associated with an individual or organization. Examples of a removable marking element account include a payment account, an access account, a secure data account, a membership account, a mobile network account, an identity account, or any other suitable type of account. A removable marking element account may include or be associated with a value such as an amount of funds (e.g., a monetary value), entrance credentials, security information, identity data, or any other suitable data value. A removable marking element account may be identifiable by one or more sets of information, such as an access credential and/or a product identifier.

A "payment account" may include a user account that is usable for making payments. Examples of a payment account include a credit card account, a bank account such as a checking account or savings account, a prepaid account, or any other suitable account associated with payments. In some embodiments, a payment account may be associated with one or more removable markings. A payment account may be identifiable based on payment account information, such as payment credentials.

An "entrance account" may include an account that is usable for obtaining access to a restricted area or restricted information.

A "credential" may be any suitable information that serves as reliable evidence of worth, ownership, identity, or authority. A credential may be a string of numbers, letters, or any other suitable characters that may be present or contained in any object or document that can serve as confirmation.

An "access credential" may be a credential associated with permission. For example, an access credential may provide access to funds, entrance, security clearance, or any other suitable type of access. An access credential may be associated with an account, such as a removable marking element account, a payment account, or a security account, and an access credential may include an account identifier. Examples of access credentials include payment credentials (e.g., a primary account number), entrance credentials, security credentials, identity credentials, and any other suitable type of credentials. An example of a security credential is a security code, which may be any suitable information associated with security. For example, a security code can include a set of alphanumeric characters, an image, or any other suitable value associated with access to a secure area or secure information.

"Payment credentials" may include a type of access credential that is used for payments. Payment credentials may be directly related to the account or may be derived from information related to the account. Examples of payment credentials may include a PAN (primary account number or "account number"), user name, expiration date, and verification values such as CVV (card verification value), dCVV (dynamic card verification value), CVV2 (card verification value 2), CVC3 card verification values, etc. An example of a PAN is a 16-digit number, such as "4147 0900 0000 1234."

A "product identifier" may be any suitable information for identifying a product. In some embodiments, a product identifier may be associated with a removable marking element account, but may not be configured for using the removable marking element account. For example, a product identifier may be a non-transactable identifier.

A "steganographic image" may comprise an image that includes hidden information. Examples of a steganographic image include an image that has been scrambled, an image that includes invisible information, an image that includes obscured or disguised information, an image that includes encoded information, and any other suitable image that includes concealed information. In some embodiments, when the steganographic image is viewed by the human eye (e.g., viewed without using tools or manipulation to reveal the hidden information), the viewer may see a "decoy image". The decoy image may be any suitable image that does not reveal the hidden information. In some embodiments, the decoy image may appear to be an inconspicuous normal image and not include any indication that there is concealed data (e.g., it may not be apparent or detectable that the image is a steganographic image). A decoy image can take the form of a generic image (e.g., a logo or landscape), a decorative picture, a white noise image, a scrambled image, a blank or empty image, a user-selected image, or any other suitable image.

A "mobile device" may include any suitable device that is moveable. In some embodiments, a mobile device may be any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "device identifier" may comprise any suitable information that serves to identify a device. Examples of a device identifier include a MSISDN, a phone number, an SMS text address, an IP address, or any other information that may be used to identify a mobile device. In some embodiments, a device identifier can include a unique device number, such as an international mobile station equipment identity (IMEI) number, a unique serial number (i.e., integrated circuit card identifier (ICCI)) of a subscriber identification module (SIM) card, or a unique international mobile subscriber identity (IMSI).

An "application" may be computer code or other data stored on a computer readable medium (e.g. memory element or secure element) that may be executable by a processor to complete a task.

A "machine readable code" may include information that can be read by a machine. In some embodiments, a machine readable code includes information that can be scanned, photographed, received in an electronic message, or otherwise accessed by a machine such as a computer or a mobile device. An example of a machine readable code is a barcode. A barcode can include numbers and a pattern of parallel lines of varying widths, the parallel lines encoding information. A mobile device can scan a barcode to determine the size and width of the lines in the barcode, and the mobile device can obtain information based on the size and distance between the parallel lines. Another example of a machine readable code is an RFID (radio frequency identification) chip. A mobile device may be able to scan an RFID chip by transmitting radio waves. The RFID chip may respond with radio waves that communicate information stored in the RFID chip.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a removable marking element, a payment device, and/or mobile device.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a removable marking element 115 and a mobile device 120 operated by a user 110. The removable marking element 115 may be associated with a machine readable code 112. The system 100 further comprises a resource provider computer 130, a transport computer 140, a transaction processing computer 150, and an authorizing entity computer 160, each of which may be embodied by one or more computers. The removable marking element 115 may be in communication with an access device 125, which may in turn be in communication with the resource provider computer 130. Also, the mobile device 120, the resource provider computer 130, the transport computer 140, the transaction processing computer 150, and the authorizing entity computer 160 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 110 may be able to use the removable marking element 115 to conduct transactions with a resource provider associated with the resource provider computer 130. The removable marking element 115 may store information associated with a removable marking element account (e.g., a payment account or access account) and/or the user 110. For example, the removable marking element 115 may store access credentials (e.g., payment credentials or other account identifiers) and may provide this information to the access device 125 during a transaction.

Figure 2:
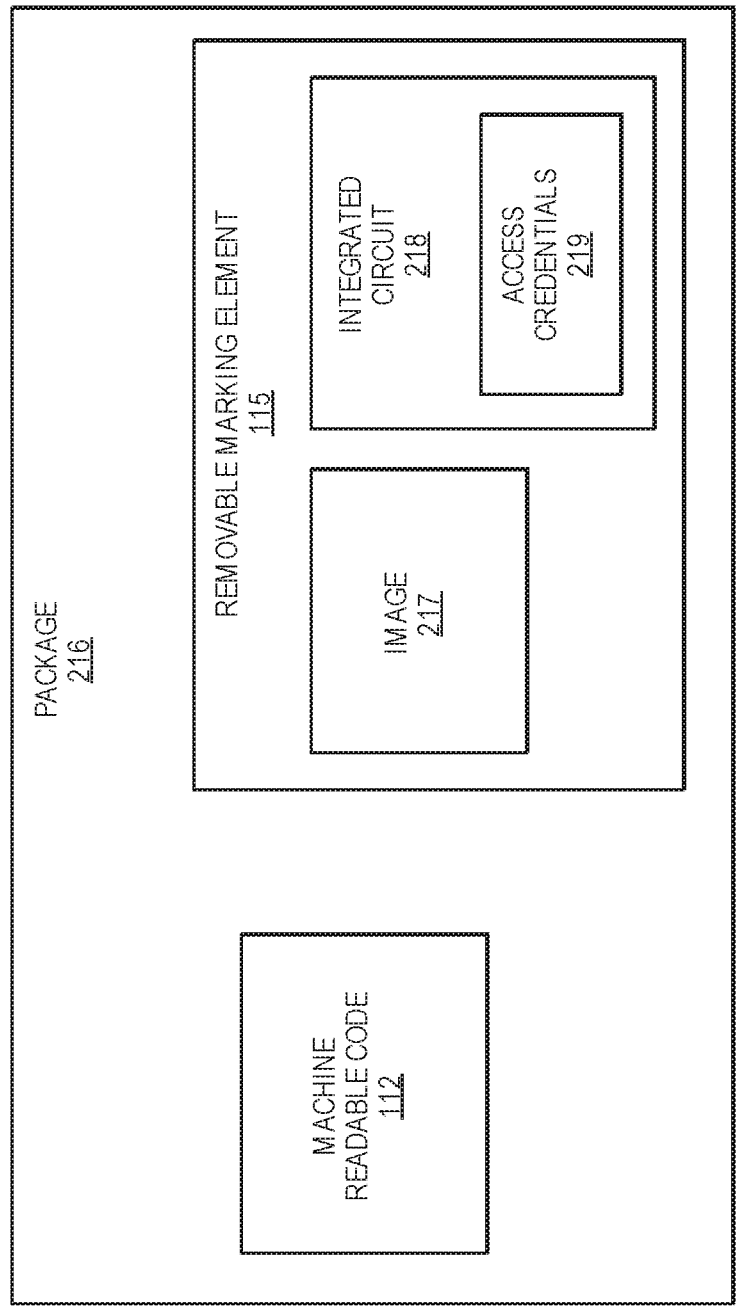
FIG. 2 shows an example of a removable marking element and associated packaging, according to an embodiment of the invention.

An example of the removable marking element 115 and associated packaging, according to some embodiments of the invention, is shown in FIG. 2. The removable marking element 115 may include an image 217. The image 217 may be visible when the removable marking element 115 is applied to user's skin (to which the removable marking element 115 may adhere). In some embodiments, the removable marking element 115 may be personalized. For example, the user 110 may select or provide a specific image 217 that may be implemented as a removable marking element 115.

The removable marking element 115 may be associated with an account (also referred to as a "removable marking element account") at the authorizing entity computer 160. The removable marking element account may be associated with a set of access credentials 219 (e.g., payment credentials or entrance credentials). The access credentials 219 may include an account identifier, such as a primary account number (PAN) and any other suitable information. In some embodiments, the removable marking element 115 may incorporate the access credentials 219.

In some embodiments, the removable marking element 115 may include an integrated circuit 218, such as a microchip. The integrated circuit 218 can be embedded in the removable marking element 115, and the removable marking element 115 can attach to a person (e.g., by adhering to skin). The integrated circuit 218 may be able to store information, and may be able to transmit information to other devices (e.g., the access device 125). In some embodiments, the integrated circuit 218 may store the access credentials 219.

An example of the removable marking element 115 applied to a user's skin and interacting with an access device 125, according to some embodiments, is shown in FIG. 3. As shown, the removable marking element 115 can be applied to the user's forearm (or any other suitable location). The integrated circuit 218, embedded in the removable marking element 115, may thereby be attached to the user's forearm. In some embodiments, the integrated circuit 218 may be undetectable to the human eye (or at least to a brief human glance), as it may be small and/or concealed by an image pattern. The user 110 may present the integrated circuit 218 to the access device 215, and the integrated circuit 218 and the access device 215 may then be able to communicate through physical contact or over a wireless communication channel (e.g., via NFC).

In some embodiments, the integrated circuit 218 can store any other suitable information. For example, the integrated circuit 218 may store a user's contact information (e.g., a phone number or address), medical information, or any other suitable information. In some embodiments, the removable marking element 115 may also function as a safety or tracking device for a child. If a child is lost, a merchant (or other entity with a scanning access device) may be able to scan the integrated circuit 218 to obtain information about the child, such as a parent's phone number, medical information, or a meetup location. In some embodiments, the integrated circuit 218 may also include GPS functionality (e.g., for tracking a child, or tracking transaction locations).

Referring back to FIG. 2, in some embodiments, the removable marking element 115 may alternatively or additionally include a steganographic image. For example, some or all of the image 217 may be a steganographic image. In some embodiments, the access credentials 219 may be hidden in the steganographic image. In some embodiments, the access device 125, the authorizing entity computer 160, or any other suitable computer may be able to decode the steganographic image and obtain the access credentials 219 (e.g., based on a photograph or scan of the steganographic image).

The user 110 can obtain the removable marking element 115 from a store, an issuer, a security administrator, or any other suitable entity. In some embodiments, the removable marking element 115 can be pre-programmed or otherwise already include the access credentials 219 before the user obtains the removable marking element 115. However, the removable marking element account may be inactive, empty, and/or not include any funds or access information. Accordingly, after obtaining the removable marking element 115, the user 110 may seek to activate, load, manage, and/or personalize the removable marking element 115 and removable marking element account.

As shown in FIG. 2, the removable marking element 115 may be provided to the user 110 in a package 216, and the package 216 may include information for accessing the removable marking element account and/or activating the removable marking element 115. In some embodiments, this information can take the form of a machine readable code 112. It may be beneficial to provide such account identifying information on the package 216 because the removable marking element 115 may not include any visible or user-readable account information.

In some embodiments, the removable marking element 115 may be viewable within the package 216, allowing the user 110 to select a removable marking element 115 based on the image 217. In some embodiments, the machine readable code 112 may not be visible or scan-able until the package 216 is opened and the removable marking element 115 is removed. For example, the machine readable code 112 may be hidden behind the removable marking element 115 when the package 216 is not yet opened.

In some embodiments, the machine readable code 112 may include a barcode, an RFID chip, or any other suitable type of machine readable code. The mobile device 120 may be able to read or scan the machine readable code 112, or otherwise obtain information from the machine readable code. For example, the machine readable code 112 may be a barcode, and the mobile device 120 may be able to scan or capture an image of the barcode. In another example, the machine readable code 112 may be an RFID chip, and the mobile device 120 may be able to use RF to communicate with the RFID chip and obtain information encoded in the RFID chip.

The machine readable code 112 may include removable marking element account-identifying information. For example, the machine readable code 112 may include a product identifier or access credentials 219. A product identifier may serve to identify the removable marking element account, but may not be used for transactions. A product identifier may be included on the package 216 to allow activation of the removable marking element account without exposing sensitive information (e.g., transactable information). The access credentials 219 may identify the removable marking element account, and may be used for transactions involving the removable marking element account.

Accordingly, the machine readable code 112 may enable the user 110 to access the removable marking element account. As a result, once the user 110 obtains the removable marking element 115, the user 110 may be able to activate and manage the removable marking element account (e.g., even if there is no account information printed on the removable marking element 115).

Referring back to FIG. 1, in some embodiments, the user 110 can use the mobile device 120 to activate and manage the removable marking element 115. For example, the user 110 may operate the mobile device 120 to scan the machine readable code 112. The mobile device 120 may be able to determine the account-identifying information (e.g., a product identifier or an access credential) from the machine readable code 112.

The mobile device 120 can communicate with the authorizing entity computer 160 about removable marking element accounts. For example, the mobile device 120 may include an application that is programmed to communicate with the authorizing entity computer 160. The application may include a URL or other information for contacting the authorizing entity computer 160. The application may also include instructions for the mobile device 120 to communicate with the authorizing entity computer 160 when a removable marking element identifier is obtained (e.g., by scanning a machine readable code).

In some embodiments, once the mobile device 120 scans the machine readable code 112, the mobile device 120 may send the machine readable code information (e.g., a product identifier) to the authorizing entity computer 160. The authorizing entity computer 160 may identify the removable marking element account based on the machine readable code information, and may allow the user 110 to manage the account via the mobile device 120. In some embodiments, the authorizing entity computer 160 may also link or associate the mobile device 120 with the removable marking element account (e.g., the mobile device 120 may be set as a managing device). As a result, the machine readable code 112 may enable the user 110 to activate, fund, and otherwise manage the removable marking element 115 and removable marking element account.

In some embodiments, instead of the machine readable code 112, the package 216 in FIG. 2 may include another type of information. For example, the package 216 may include a printed alphanumeric product identifier or access credentials 219. Alternatively, when the user 110 first requests or obtains a removable marking element 115, removable marking element account-identifying information may be mailed to the user 110 or electronically transmitted to the user's mobile device 120. For example, the user 110 may provide a mailing address or mobile device 120 contact information to a removable marking element 115 provider (e.g., a merchant or issuer).

In another embodiment, if the removable marking element 115 includes a steganographic image, the user 110 can capture an image in the removable marking element 115 with the mobile device 120. The mobile device 120 can transmit the image to the authorizing entity computer 160, and thereby gain access to the removable marking element account.

An example of removable marking element account management via the mobile device 120, according to some embodiments of the invention, can be described with respect to FIGS. 4A-4B.

FIG. 4A shows an example mobile device 120 graphical user interface displayed or a display of the mobile device 120. The mobile device 120 graphical user interface may be provided by a removable marking element management application. The removable marking element application may communicate with and provide account management instructions to the authorizing entity computer 160. As shown in FIG. 4A, in addition to activating a removable marking element account, the removable marking element application may allow the user 110 to link a removable marking element 115 with the mobile device 120. For example, the user 110 may select a "link a removable marking element" function 422, and then the mobile device 120 may activate a camera or other scanner for scanning the machine readable code 112. Once scanned, the mobile device 120 may transmit the machine readable code information, mobile device identification information (e.g., a phone number, email address, MSISDN, etc.), and any other suitable information to the authorizing entity computer 160 (e.g., via a URL or other contact information stored at the application). The authorizing entity computer 160 may then link the removable marking element account with the mobile device 120. For example, the authorizing entity computer 160 may associate a mobile device identifier with the removable marking element account.

The mobile device 120 (e.g., via the removable marking element application) may also allow the user 110 to manage removable marking element account settings, such as removable marking element 115 permissions and restrictions. For example, the user 110 may select a "Manage Permissions" function 424, and then the user 110 may specify parameters for the account. The user 110 may indicate when and where the removable marking element 115 can be used, what type of transactions the removable marking element 115 can be used for, and any other suitable restrictions. For example, the removable marking element 115 may be worn by a child, and a parent may set purchase restrictions. The user 110 may also be able to block or suspend the account (e.g., when the user 110 suspects fraudulent or inappropriate use).

The mobile device 120 (e.g., via the removable marking element application) may also allow the user 110 to load funds, provide entrance credentials or a security code, or otherwise provide value or access data to the removable marking element account. For example, the user 110 may select a "Load Funds" function 423. The user 110 may then provide payment information for a second account, and specify an amount of funds to be transferred from the second account to the removable marking element account. The second account may be a separate pre-existing account associated with the user 110. Accordingly, the removable marking element account may be funded by the second account, and the removable marking element account may effectively function as a prepaid account.

FIG. 4B shows an example user interface for loading funds. The user 110 may select one of multiple linked removable markings 115 (e.g., by selecting one of several linked accounts at an account list 427), and may specify the amount of funds to transfer (e.g., by entering a value in an amount field 428). The user 110 may also provide information about a second account to serve as the source of funds. Once the funding request is submitted, the removable marking element account may be funded as a prepaid account.

Alternatively, in some embodiments, the user 110 may request that the removable marking element account become linked with a second account (e.g., a separate debit account, credit account, or prepaid account), such that when the removable marking element 115 is used for a transaction, the second account may be charged. Accordingly, the removable marking element 115 may effectively function as a payment device for the second account.

In some embodiments, as mentioned above, the removable marking element 115 can be used for transactions other than payments. For example, instead of funds, the user 110 may provide identification, security, or access information via the removable marking element application, such that the removable marking element 115 can function as an access badge or security token. The user 110 may also provide login credentials for a separate access or security account, such that the authorizing entity computer 160 can obtain access or security credentials from the separate account and load the credentials to the removable marking element account (or link the removable marking element account with the separate account).

An example of a mobile device display for configuring access functionality, according to embodiments of the invention, is shown in FIG. 5A. The mobile device 120 (e.g., via the removable marking element application) may allow the user 110 to provide a security code, entrance credentials, login information, or otherwise provide access data to the removable marking element account. For example, the user 110 may select a "configure access" function 523.

Then, as shown in FIG. 5B, the mobile device 120 may provide a user interface for configuring access. The user 110 may select one of multiple linked removable markings 115 (e.g., by selecting one of several linked accounts at an account list 527) and may also provide a security code (e.g., by entering a value in an security code 528). For example, the user 110 may enter a security code for accessing a building. The mobile device 120 may then send the security code to the authorizing entity computer 160, and the authorizing entity computer 160 may associate the security code with the removable marking element account. As a result, the removable marking element 115 may then be associated with the security code, and may thereby be configured to provide access (e.g., to a building).

Alternatively, in some embodiments, the user 110 may request that the removable marking element account become linked with a second account (e.g., a separate security account or entrance account). For example, the user 110 may provide access credentials or login information associated with the second account. As a result, when the removable marking element 115 is used for an access transaction, the second account may be identified and used for authorizing the transaction. For example, a security code (or other entrance credentials) from the second account may be used to authorize the transaction. Accordingly, the removable marking element 115 may effectively function as a token for the second account. For example, the removable marking element 115 may serve as a replacement for a pre-existing access badge.

Figure 6:
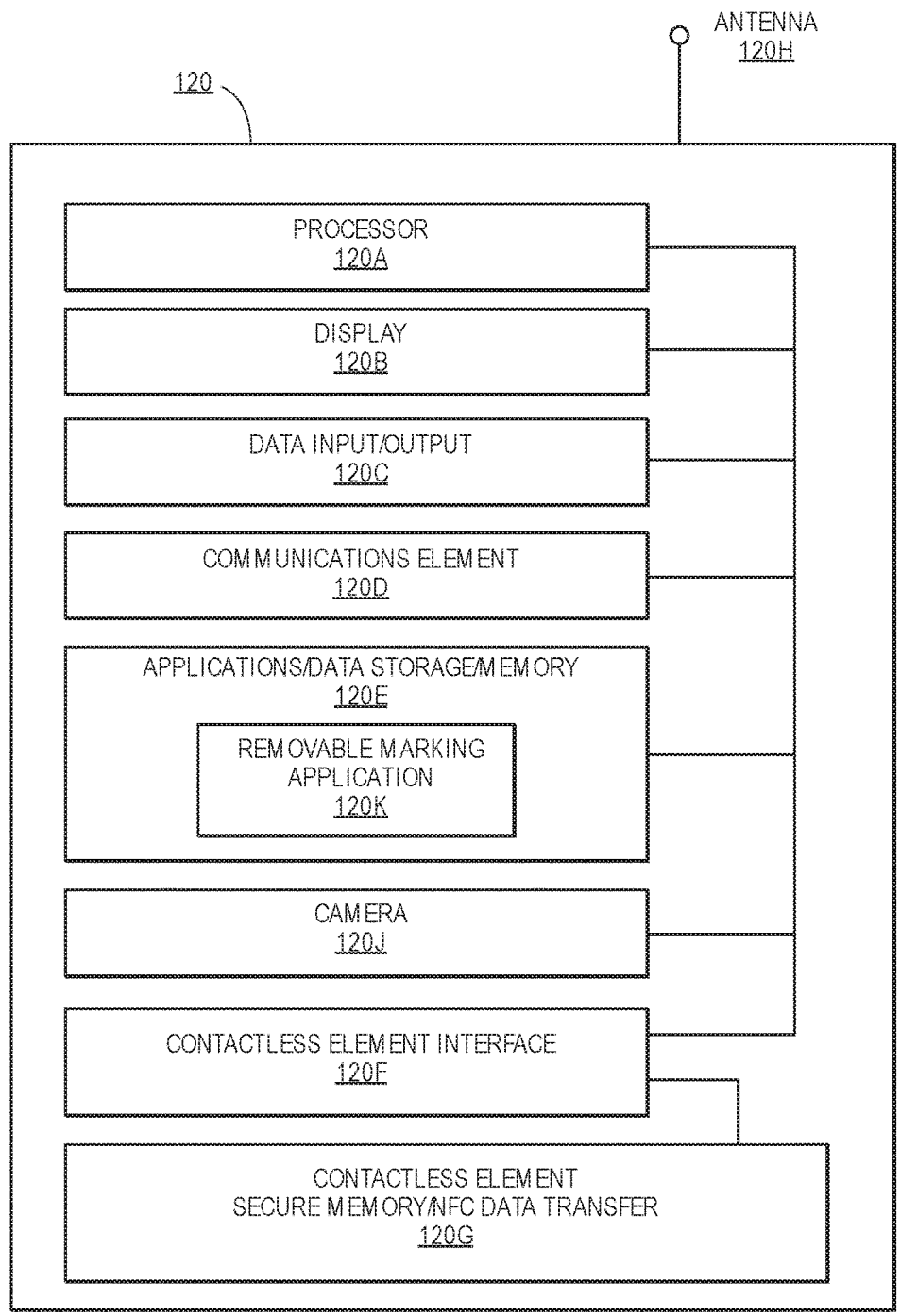
FIG. 6 shows a block diagram of an exemplary mobile device, according to an embodiment of the invention.

An example of a mobile device 120, according to some embodiments of the invention, is shown in FIG. 6. The mobile device 120 may include circuitry that is used to enable certain device functions, such as telephony. The functional elements responsible for enabling those functions may include a processor 120A that can execute instructions that implement the functions and operations of the device. Processor 120A may access memory 120E (or another suitable data storage region or element) to retrieve instructions or data used in executing the instructions, such as mobile applications. Data input/output elements 120C, such as a keyboard or touchscreen, may be used to enable a user to operate the mobile device 120 and input data (e.g., user authentication data). Data input/output elements may also be configured to output data (via a speaker, for example).

Display 120B may also be used to output data to a user. Communications element 120D may be used to enable data transfer between the mobile device 120 and a wired or wireless network (via antenna 120H, for example) to assist in connectivity to the Internet or other network, and enabling data transfer functions. The mobile device 120 may also include contactless element interface 120F to enable data transfer between contactless element 120G and other elements of the device, where contactless element 120G may include a secure memory and a near field communications data transfer element (or another form of short range communications technology). The mobile device 120 may also include a camera 120J. The camera 120J may be used for capturing or scanning images, such as photos of machine readable codes, steganographic images, removable markings, or any other suitable photo subject. As noted, a cellular phone or similar device is an example of a mobile device 120 that may be used in accordance with embodiments of the present invention. However, other forms or types of devices may be used without departing from the underlying concepts of the invention. For example, the mobile device 120 may alternatively be in the form of a key fob, a tablet computer, a wearable device, a vehicle such as a car, etc.

The memory 120E may comprise a removable marking element application 120K and any other suitable module or data. The mobile device 120 may have any number of mobile applications installed or stored on the memory 120E and is not limited to that shown in FIG. 6. The memory 120E may also comprise code, executable by the processor 120A for implementing a method comprising obtaining a product identifier by obtaining a machine readable code associated with a removable marking element adapted to adhere to skin, wherein the removable marking element includes an integrated circuit that is configured to transmit a first access credential associated with a first account over a wireless communication channel to an access device during a transaction; and transmitting, to the server computer, a message comprising the product identifier, a value, and a second access credential associated with a second account, wherein the server computer identifies the first account based on the product identifier, and wherein the server computer loads the first account with the value from the second account.

The removable marking element application 120K may provide a user interface for the user 110 to provide input for activating and managing a removable marking element using the mobile device 120. The removable marking element application 120K may be programmed to cause the processor 120A to communicate with the authorizing entity computer 160, or any other suitable manager of removable marking element accounts. For example, the removable marking element application 120K may include information for contacting the authorizing entity computer 160, such as a URL, email address, or phone number. The removable marking element application 120K may also include instructions to scan a removable marking element-associated machine readable code, send the machine readable code and mobile device 120 identification information to an authorizing entity computer 160, receive funding information and management information from the user 110, send funding information and management information to the authorizing entity computer 160, store information about one or more removable marking element accounts (e.g., product identifiers), and perform any other suitable account management functions. In some embodiments, the removable marking element application 120K may be provided to the mobile device 120 by the authorizing entity computer 160 or by any other suitable entity. Also, the functionality of the removable marking element application 120K may be included in a mobile wallet application.

Referring back to FIG. 1, the resource provider computer 130 may be associated with a resource provider, which may be an entity that can provide a resource such as goods, services, information, and/or access. Examples of a resource provider include merchants, access devices, secure data access points, etc. A merchant may typically be an entity that engages in transactions and can sell goods or services, or provide access to goods or services.

The resource provider may accept multiple forms of payment (e.g., the removable marking element 115) and may use multiple tools to conduct different types of transactions. For example, the resource provider may operate a physical store and use the access device 125 for in-person transactions. The resource provider may also sell goods and/or services via a website, and may accept payments over the Internet.

The transport computer 140 may be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers. The transport computer 140 may be more specifically referred to as an acquirer computer.

The transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 150 may use any suitable wired or wireless network, including the Internet.

The transaction processing computer 150, the transport computer 140, and the authorizing entity computer 160 may operate suitable routing tables to route authorization request messages and/or authorization response messages using access credentials (e.g., payment credentials), merchant identifiers, and/or other account identifiers.

The authorizing entity computer 160 may be associated with an authorizing entity, which may be an entity that authorizes a request. An example of an authorizing entity may be an issuer, which may typically refer to a business entity (e.g., a bank) that maintains an account for a user. An issuer may issue and manage a removable marking element account associated with the removable marking element 115.

An authorizing entity may also be a local service provider (e.g., an event host) or an authentication entity (e.g., a security administrator or an identity authenticator). For example, a removable marking element 115 may be used as a replacement for a typical payment device or identity card for a specific event (e.g., a concert or sporting event), and the removable marking element 115 may be provided by the administrator of the event. Additionally, a removable marking element account may be funded with event-specific funds, or used for a closed-loop system. For example, a user 110 may purchase a certain amount of ride tickets at a theme park, and the ride tickets may be loaded onto the removable marking element account.

Figure 7:
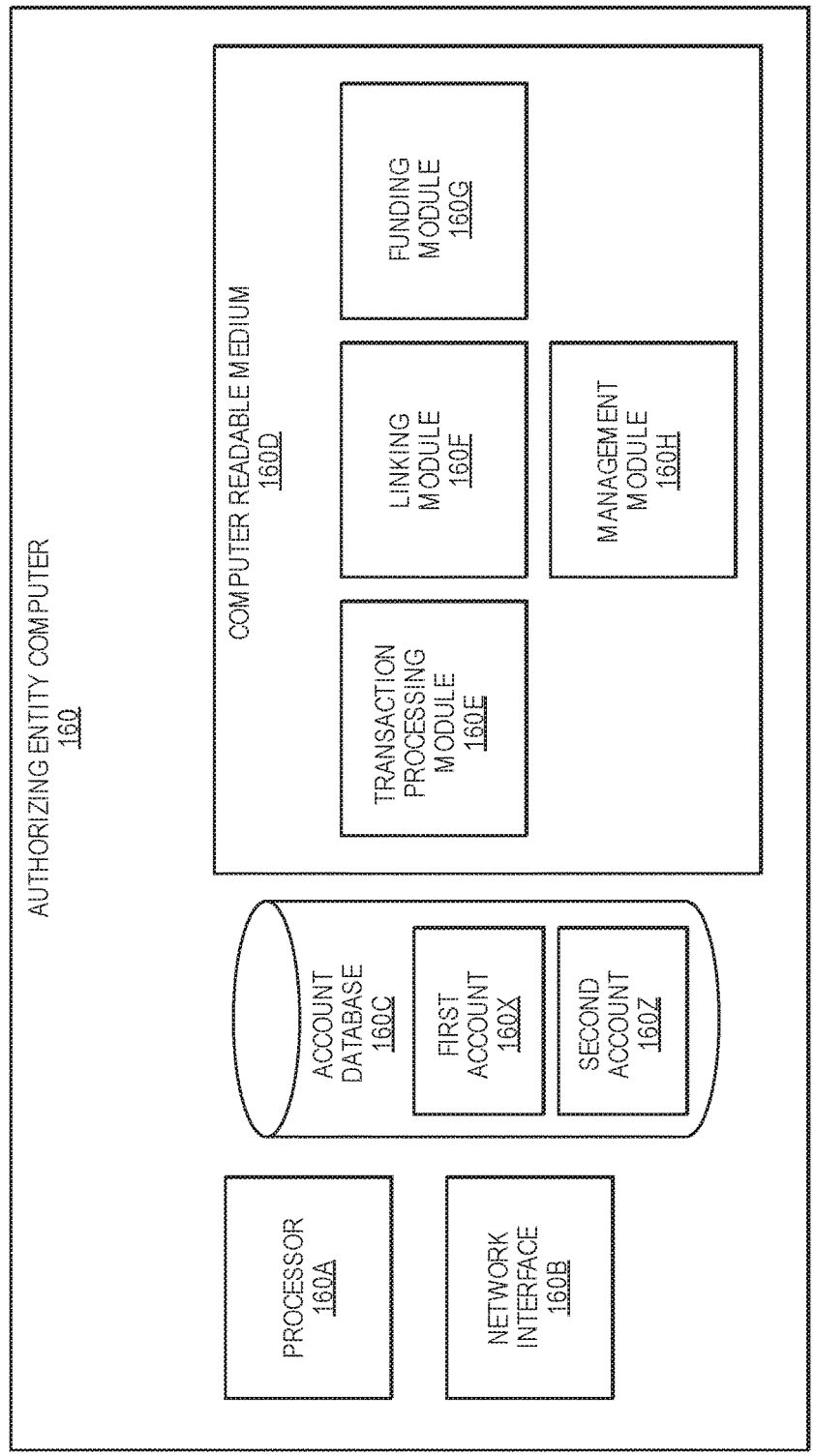
FIG. 7 shows a block diagram of an authorizing entity computer, according to an embodiment of the invention.

An example of the authorizing entity computer 160, according to some embodiments of the invention, is shown in FIG. 7. The authorizing entity computer 160 comprises a processor 160A, a network interface 160B, an account database 160C, and a computer readable medium 160D.

The computer readable medium 160D may comprise a transaction processing module 160E, a linking module 160F, a funding module 160G, a management module 160H, and any other suitable software module. The computer readable medium 160D may also comprise code, executable by the processor 160A for implementing a method comprising receiving, from a mobile device, a message including a value, a second access credential associated with a second account, and a product identifier associated with a removable marking element adapted to adhere to skin, wherein the mobile device obtained the product identifier by obtaining a machine readable code associated with a removable marking element, and wherein the removable marking element includes an integrated circuit that is configured to transmit a first access credential associated with a first account over a wireless communication channel to an access device during a transaction; identifying the first account based on the product identifier; and loading the first account with the value from the second account.

The account database 160C may include information associated with one or more accounts. This can include account records for removable marking element accounts and/or typical accounts (e.g., normal credit, debit, or prepaid accounts that may be associated with a typical payment device). As shown in FIG. 7, the account database 160C can include a first account 160X and a second account 160Z. In some embodiments, the first account 160X may be a removable marking element account, and the second account 160Z may be a separate account that is used as a source of value (e.g., funds or entrance credentials) for the first account 160X, or otherwise associated with the first account 160X. For example, the second account 160Z may be a pre-existing normal payment account that is used to fund the first account 160X. In some embodiments, the first account 160X may initially be empty and without value until the first account 160X is loaded with a value from the second account 160Z.

The first account 160X may include a first access credential, a product identifier, an amount of funds, access codes, information about an associated mobile device, information about an associated second account 160Z, a transaction history, and/or any other suitable information. The second account 160Z may include a second access credential, an amount of funds, access codes, information about an associated mobile device, information about an associated first account 160X, a transaction history, and/or any other suitable information.

In some embodiments, the second account 160Z may not be managed by the authorizing entity computer 160. For example, the second account 160Z may be an external account at a different authorizing entity (e.g., a different security administrator or bank). Also, the opposite arrangement can take place (e.g., the first account 160X may be an external account at a different authorizing entity, and the second account 160Z may be managed by the authorizing entity computer 160).

The transaction processing module 160E may comprise code that causes the processor 160A to process transactions. For example, the transaction processing module 160E may contain logic that causes the processor 160A to analyze transaction risk, and to authorize or reject authorization request messages for transactions. The transaction processing module 160E may be configured to determine whether an account (e.g., a removable marking element account) has sufficient funds or a suitable access code for a transaction. The transaction processing module 160E may also be configured to debit or credit a removable marking element account, as well as send a transaction notification to a mobile device associated with a transaction.

The linking module 160F may comprise code that causes the processor 160A to create associations between accounts and/or devices. For example, the linking module 160F may contain logic that causes the processor 160A to associate a removable marking element account with a mobile device (e.g., by storing a mobile device identifier in a removable marking element account record at the account database 160C).

The funding module 160G may comprise code that causes the processor 160A to provide funds or access codes to a removable marking element account. For example, the funding module 160G may contain logic that causes the processor 160A to receive a funding request including an amount of funds and a payment source (e.g., a pre-existing separate payment account, such as the second account 160Z), draw the funds from the payment source, and credit the funds to the removable marking element account. The funding module 160G may also be configured to load access, security, login, or identity credentials to a removable marking element account.

The management module 160H may comprise code that causes the processor 160A to manage a removable marking element account. For example, the management module 160H may contain logic that causes the processor 160A to receive management instructions from a user (e.g., via a mobile device) about account settings, and to apply the settings to the removable marking element account. For example, the management module 160H may be configured to set account-use restrictions, associate a phone number or address with the account, temporarily block or lock the account, and otherwise manage the account.

Figure 8:
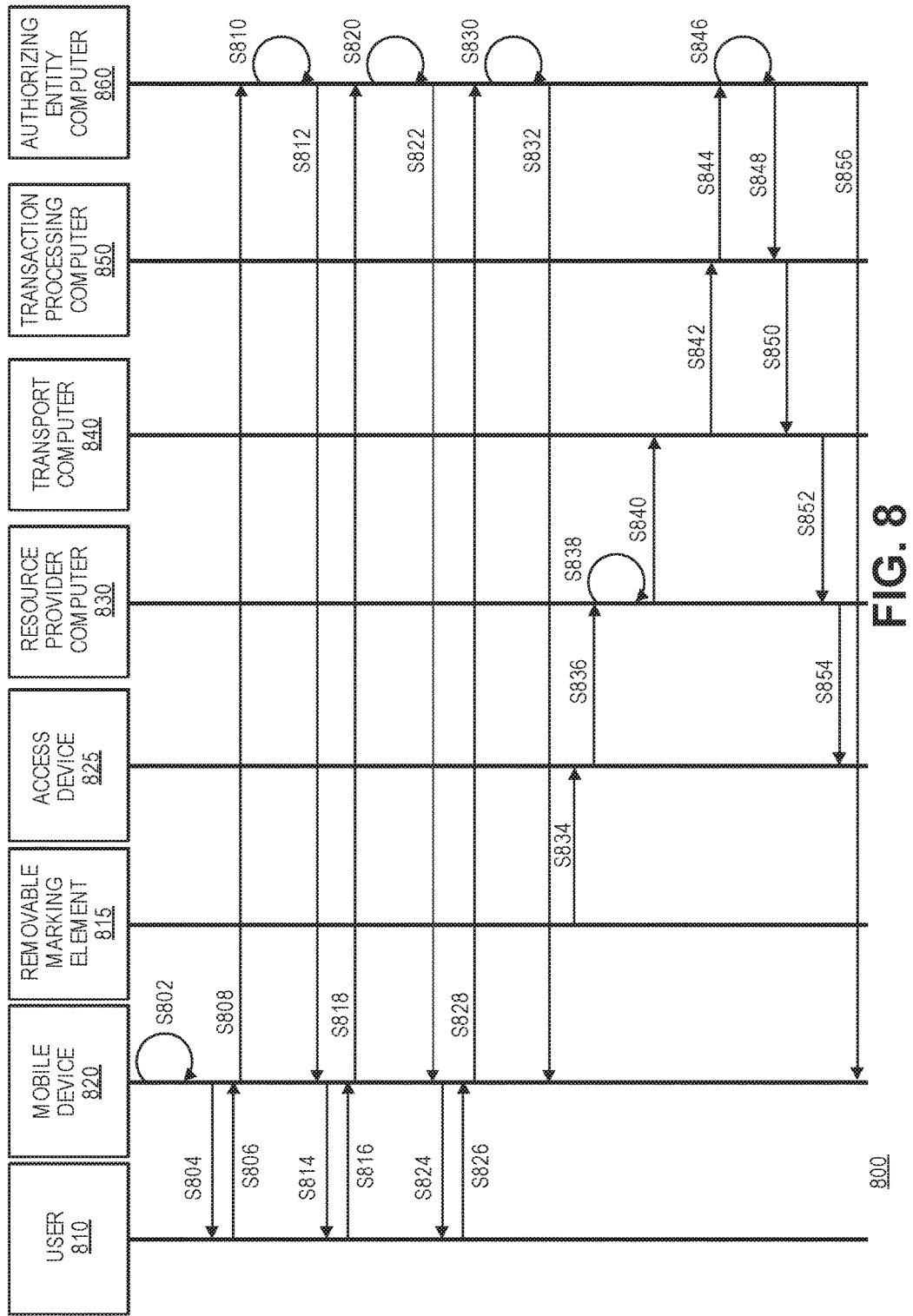
FIG. 8 shows a flow diagram illustrating a method for managing and transaction with a removable marking element, according to embodiments of the invention.

A method 800 according to embodiments of the invention can be described with respect to FIG. 8. Some elements in other Figures are also referred to. The steps shown in the method 800 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

An authorizing entity computer 860 may create (and/or activate) one or more removable marking element accounts. The authorizing entity computer 860 may provide an access credential and/or a product identifier with each removable marking element account. The authorizing entity computer 860 may also associate one or more removable markings with each removable marking element account.

The authorizing entity computer 860 or a separate entity may manufacture the removable markings. Each removable marking element may include an integrated circuit, and each integrated circuit may be configured to include an access credential that can identify an associated removable marking element account. In some embodiments, the removable marking element accounts may initially not include any value, but may be associated with an access credential and a functioning removable marking element. For example, each removable marking element account may be configured as an unloaded prepaid account.

The removable markings may be packaged for distribution, and the packages may include product identifiers for identifying the associated the removable marking element accounts. For example, the packages may include machine readable codes.

A user 810 may desire to use a removable marking element 815. For example, the user 810 may obtain a removable marking element 815 to use as a payment device, to give to a child for use as a payment device, to use as a ticket for entry to an event, to use as a security badge, to use as personal identification, or for any other suitable purpose. In this method description, the example of a removable marking element 815 being used as a payment device will be described.

The user 810 may obtain the removable marking element 815 from a store, a bank, an event host, or any other suitable service provider. The removable marking element 815 may be in a package. The user 810 may open the removable marking element 815 and apply it to their body (e.g., the forearm). The package may also include a machine readable code for accessing and activating a removable marking element account associated with the removable marking element 815.

At step S802, the user 810 may operate the mobile device 820 to scan, photograph, or otherwise obtain the machine readable code. For example, the mobile device 820 can scan a barcode or an RFID chip on the package. The user 810 may also activate a removable marking element application on the mobile device 820.

At step S804, the mobile device 820 may display an option for activating the removable marking element 815 and/or linking the removable marking element 815 with the mobile device 820. At step S806, the user 810 may initiate a removable marking element 815 activation and/or linking process (e.g., by selecting an "activate" or "link" indicator, or by scanning a machine readable code).

At step S808, the mobile device 820 may send a request to the authorizing entity computer 860 to activate the removable marking element 815 and/or link the removable marking element 815 with the mobile device 820. The request may include information for identifying the removable marking element 815 and an associated removable marking element account. For example, the request may include information from the scanned machine readable code (e.g., an access credential or a product identifier). The request may also include information about the mobile device 820, such as an MSISDN, a phone number, an email address, or any other suitable contact information.

At step S810, the authorizing entity computer 860 may receive the request and identify the removable marking element account based on the information in the request. The authorizing entity computer 860 may activate the removable marking element account so that the removable marking element 815 can be used for transactions. The authorizing entity computer 860 may also create an association between the removable marking element account and the mobile device 820. For example, the authorizing entity computer 860 may add mobile device 820 identification information to a removable marking element account record in a removable marking element account database.

At step S812, the authorizing entity computer 860 may send an activation and/or linking response message back to the mobile device 820. The mobile device 820 may inform the user 810 that the account was activated.

The mobile device 820 may also store information about the linked removable marking element account and/or removable marking element 815. For example, the mobile device 820 may store an access credential, a product identifier, an image or icon resembling the removable marking element 815, and/or any other suitable information. As a result, the mobile device 820 may be able to contact the authorizing entity computer 860 in the future for additional removable marking element account management. Alternatively, the user 810 may rescan the barcode in the future to perform additional account management activities.

At step S814, the mobile device 820 may prompt the user 810 to fund the removable marking element account. For example, the mobile device 820 may provide a display with spaces for entering payment information and an amount.

At step S816, the user 810 may provide information about a source of funds (e.g., a separate payment account), as well as an amount to load onto the removable marking element account for use by the removable marking element 815. In some embodiments, the user 810 may request that a separate payment account be used as a constant source of funds for the removable marking element account, or that the removable marking element account is automatically re-loaded when it drops below a certain balance.

At step S818, the mobile device 820 may send a funding request to the authorizing entity computer 860. The request may include any suitable data value. For example, the request may include the funding information provided by the user 810, account-identifying information (e.g., a product identifier), a request to purchase a certain amount of tickets or closed-loop currency, and any other suitable information.

At step S820, the authorizing entity computer 860 may load funds onto the removable marking element account. For example, the authorizing entity computer 860 may debit a separate account (e.g., indicated by the user 810) and credit the removable marking element account. Loading funds may involve a transfer of funds from a separate funding account to the removable marking element account. For example, one or more authorization request messages, clearance messages, and settlement messages can be sent between the authorizing entity computer 860 and an issuer of the separate funding account in order to transfer the funds.

In some embodiments, the authorizing entity computer 860 may create an association between the removable marking element account and a separate account, such that the removable marking element account can continually draw funds. In some embodiments, the authorizing entity computer 860 may identify the removable marking element account to be funded based on account-identifying information (e.g., a product identifier) received in the loading request, or based on the mobile device 820 that sent the request.

At step S822, the authorizing entity computer 860 may send a funding response to the mobile device 820. The response may indicate that the removable marking element account was successfully funded. The mobile device 820 may also inform the user 810 that the account was funded.

At step S824, the mobile device 820 may prompt the user to provide account settings. For example, the mobile device 820 may present the user 810 with one or more options for account use and notifications.

At step S826, the user 810 may specify one or more account settings. For example, the user 810 may set use-restrictions on the removable marking element 815, such as when the removable marking element 815 can be used (e.g., total time duration, time of day, day of week, etc.), where the removable marking element 815 (e.g., location or merchant-type), how the removable marking element 815 can be used (e.g., type of items that can be purchases, or spending limits), or any other suitable type of use-control. The user 810 may also provide similar parameters for when transaction notifications should be sent (e.g., based on time, location, merchant, item type, transaction amount, etc.).

At step S828, the mobile device 820 may send an account management request to the authorizing entity computer 860. The request may include the account settings information provided by the user 810, account-identifying information (e.g., a product identifier), and any other suitable information.

At step S830, the authorizing entity computer 860 may update account settings associated with the removable marking element account. For example, the authorizing entity computer 860 set use-restrictions, notification parameters, and any other suitable account personalization as requested by the user 810. In some embodiments, the authorizing entity computer 860 may identity the removable marking element account to be managed based on account-identifying information (e.g., a product identifier) received in the account management request, or based on the mobile device 820 that sent the request.

At step S832, the authorizing entity computer 860 may send an account management response to the mobile device 820. The response may indicate that the removable marking element account settings were successfully updated. The mobile device 820 may also inform the user 810 that the account was updated.

In some embodiments, the mobile device 820 may combine one or more of steps S808, S818, and S828 into one step. For example, the mobile device 820 may send one message that includes information for both activating the account and loading funds.

The removable marking element account may then be activated, funded, and personalized. As a result, the removable marking element 815 may be ready for use. For example, the user 810 may apply the removable marking element 815 to their body and use it for a transaction. The user 810 may present the removable marking element 815 to an access device 825 at a resource provider location.

At step S834, the removable marking element 815 may provide access credentials (e.g., a PAN) to the access device 825. For example, the access device 825 may be able to communicate with the removable marking element 815 (e.g., over a wireless communication channel such as NFC) or capture an image of the removable marking element 815 (e.g., of a steganographic image).

At step S836, the access device 825 may send the removable marking element account credentials to a resource provider computer 830. The access device 825 may also provide transaction information to the resource provider computer 830, such as information about the goods and/or services being purchased, a transaction amount, and any other suitable information.

At step S838, the resource provider computer 830 may generate a transaction request message (e.g., an authorization request message) for the transaction. The transaction request message may include the transaction amount, the access credentials, a merchant ID, and/or any other suitable information. In some embodiments, the transaction request message may alternatively be generated by the access device 825.

The transaction request message may then be transmitted and routed to the authorizing entity computer 860 for authorization. For example, at step S840, the resource provider computer 830 may send the transaction request message to a transport computer 840. At step S842, the transport computer 840 may forward the transaction request message to a transaction processing computer 850. At step S844, the transport computer 840 may forward the transaction request message to the authorizing entity computer 860.

At step S846, the authorizing entity computer 860 may authorize the transaction. For example, the authorizing entity computer 860 may perform risk processing, identify the removable marking element account based on the transaction request message, determine that the removable marking element account has sufficient funds, determine that the transaction can be authorized, and/or debit the removable marking element account for the transaction amount. The authorizing entity computer 860 may then generate a transaction response message indicating that the transaction is authorized.

The transaction response message may then be transmitted and routed back to the access device 825. For example, at steps S848-S854, the authorizing entity computer 860 may send the transaction response message to the transaction processing computer 850, which may forward the transaction response message to the transport computer 840, which may forward the transaction response message to the resource provider computer 830, which may forward the transaction response message to the access device 825.

The access device 825 may display an indication of successful authorization to the user 810 and/or a service clerk. The user 810 may then be allowed to depart with the purchased goods and/or services.

At step S856, the authorizing entity computer 860 may send a transaction notification to the mobile device 820. For example, the notification may include information about the items purchased, the purchase location, the remaining funds in the removable marking element account, the expected time remaining for the removable marking element to function (e.g., before it dissolves and falls of the body), and/or any other suitable information. The notification and/or mobile device application may also prompt the user 810 to load more funds onto the removable marking element account (e.g., if the balance is below a threshold).

At some point in time, a clearing and settlement process may occur between the transport computer 840, the transaction processing computer 850, and the authorizing entity computer 860.

After a certain amount of time, the removable marking element 815 may naturally decay and fall from the user's body, or the user 810 may remove the removable marking element 815. At that point (or at another suitable time, such as a future event), the user 810 may apply a new removable marking element, and may repeat the method 800 with the new removable marking element.

Accordingly, the user 810 can use a removable marking element 815 for transactions. The user 810 may not have to carry a separate payment instrument or access card, the removable marking element 815 can be situated comfortably on the skin instead of in the pocket (e.g., decreasing pocket bulk), and the removable marking element 815 can be securely attached to the user's body. Also, the user 810 can conveniently activate and load the removable marking element account (e.g., via a mobile device and machine readable code).

Embodiments of the invention have a number of advantages. For example, in embodiments of the invention, a removable marking element can be used instead of typical transaction devices (e.g., access cards, payment devices, personal identification cards, etc.). This advantageously increases user convenience, device security, and cost efficiency, as removable marking elements can be less expensive, easier to use, and less subject to loss than typical transaction devices. Instead of carrying one or more cards or other devices (e.g., in a bag or a pocket), a user can simply attach a removable marking element to their body (e.g., forearm). For example, the removable marking element can adhere or otherwise attach to the user's skin. This can also increase ease of use, as the user can simply present their forearm to a scanner for a transaction (e.g., instead of locating a typical transaction device in a purse and removing it for a transaction). A typical transaction device can be lost or stolen, but a removable marking element may not be left behind or stolen because it can be attached to the user's body.

Additionally, a removable marking element can beneficially serve as a transaction device for a child that normally does not have or cannot be trusted with a typical transaction device. A parent can apply the removable marking element to the child's body, and manage the removable marking element account on behalf of the child (e.g., via a mobile device). The parent can also track the child's spending and location via notifications sent to the parent when the child conducts a transaction.

Embodiments of the invention also advantageously provide a convenient way for users to manage their removable markings. A removable marking element may not have a user interface for account management, but a mobile device can serve as an intermediary between the removable marking element and the removable marking element account (e.g., at the authorizing entity).

Embodiments of the invention further advantageously provide a convenient way to activate and link a removable marking element. A user can scan a machine readable code provided with the removable marking element (e.g., printed on or attached to the packaging), and then have immediate access to the removable marking element account (e.g., for activation, funding, management, etc.). Alternatively, the user can enter an alphanumeric code printed on the packaging. In some embodiments, a code may instead be mailed or transmitted (e.g., via email or SMS) to the user. Thus, a user can access a removable marking element account even if account information is not visible on the removable marking element.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   a) obtaining, by a mobile device, a non-transactable product identifier by obtaining a machine readable code associated with a removable marking element adapted to adhere to skin, wherein the removable marking element includes an integrated circuit that is configured to transmit a first transactable access credential associated with a first account over a wireless communication channel to an access device during a transaction, the removable marking element being in the form of a temporary tattoo; and
   b) transmitting, by the mobile device, to a server computer, a message comprising the non-transactable product identifier, a value, and a second transactable access credential associated with a second account, wherein the server computer identifies the first account based on the non-transactable product identifier, and wherein the server computer loads the first account with the value from the second account.

2. The method of claim 1, wherein a user applies the removable marking element to the user's body after the message is transmitted to the server computer and presents the removable marking element to the access device, the access device configured to obtain the first transactable access credential from the removable marking element and send the first transactable access credential to an authorizing entity computer.

3. The method of claim 1, further comprising:
   receiving, by the mobile device, from a user, restrictions for the use of the first account; and
   transmitting, by the mobile device, the restrictions to the server computer, wherein the server computer updates the first account to include the restrictions.

4. The method of claim 1, wherein the value represents a security code to access a venue.

5. The method of claim 1, wherein obtaining the machine readable code includes scanning a barcode printed on packaging associated with the removable marking element, and wherein obtaining the non-transactable product identifier includes determining the non-transactable product identifier based on the scanned barcode.

6. The method of claim 3, wherein the restrictions include a spending limit for the first account.

7. The method of claim 3, wherein the restrictions include a temporary suspension of the first account.

8. The method of claim 3, wherein the restrictions include specific times when the first account is usable for a transaction.

9. The method of claim 3, wherein the restrictions include information about when transaction notifications are to be sent.

10. The method of claim 1, wherein the first transactable access credential includes a 16-digit primary account number.

11. A mobile device comprising:
   a processor; and
   a computer readable medium, the computer readable medium comprising code, executable by the processor, for implementing a method comprising:
   a) obtaining a non-transactable product identifier by obtaining a machine readable code associated with a removable marking element adapted to adhere to skin, wherein the removable marking element includes an integrated circuit that is configured to transmit a first transactable access credential associated with a first account over a wireless communication channel to an access device during a transaction, the removable marking element being in the form of a temporary tattoo; and
   b) transmitting, to a server computer, a message comprising the non-transactable product identifier, a value, and a second transactable access credential associated with a second account, wherein the server computer identifies the first account based on the non-transactable product identifier, and wherein the server computer loads the first account with the value from the second account.

12. The mobile device of claim 11, wherein the value represents an amount of funds.

13. The mobile device of claim 11, further comprising:
   receiving, from a user, restrictions for the use of the first account; and transmitting the restrictions to the server computer, wherein the server computer updates the first account to include the restrictions.

14. The mobile device of claim 11, wherein the value represents a link between the first account and the second account.

15. A method comprising:
a) receiving, by a server computer, from a mobile device, a message including a value, a second transactable access credential associated with a second account, and a non-transactable product identifier associated with a removable marking element adapted to adhere to skin, the removable marking element being in the form of a temporary tattoo,
wherein the mobile device obtained the non-transactable product identifier by obtaining a machine readable code associated with the removable marking element, and
wherein the removable marking element includes an integrated circuit that is configured to transmit a first transactable access credential associated with a first account over a wireless communication channel to an access device during a transaction;
b) identifying, by the server computer, the first account based on the non-transactable product identifier; and
c) loading, by the server computer, the first account with the value from the second account.

16. The method of claim 15, further comprising:
receiving, by the server computer, from the access device, a transaction request message including the first transactable access credential after a user applies the removable marking element to the user's body and presents the removable marking element to the access device for a transaction, and the access device obtains the first transactable access credential from the removable marking element;
identifying, by the server computer, the first account based on the first transactable access credential;
authorizing, by the server computer, the transaction based on the first account; and
sending, by the server computer, to the access device, a transaction response message indicating that the transaction is authorized.

17. The method of claim 15, further comprising:
receiving, by the server computer, from the mobile device, a message including restrictions for the use of the first account; and
updating, by the server computer, the first account to include the restrictions.

18. The method of claim 15, wherein the non-transactable product identifier is printed on packaging associated with the removable marking element.

19. A server computer comprising:
a processor; and
a computer readable medium, the computer readable medium comprising code, executable by the processor, for implementing a method comprising:
a) receiving, from a mobile device, a message including a value, a second transactable access credential associated with a second account, and a non-transactable product identifier associated with a removable marking element adapted to adhere to skin, the removable marking element being in the form of a temporary tattoo,
wherein the mobile device obtained the non-transactable product identifier by obtaining a machine readable code associated with the removable marking element, and
wherein the removable marking element includes an integrated circuit that is configured to transmit a first transactable access credential associated with a first account over a wireless communication channel to an access device during a transaction;
b) identifying the first account based on the non-transactable product identifier; and
c) loading the first account with the value from the second account.

20. The server computer of claim 19, further comprising:
receiving, from the access device, a transaction request message including the first transactable access credential after a user applies the removable marking element to the user's body and presents the removable marking element to the access device for a transaction, and the access device obtains the first transactable access credential from the removable marking element;
identifying the first account based on the first transactable access credential;
authorizing the transaction based on the first account; and
sending, to the access device, a transaction response message indicating that the transaction is authorized.

21. The server computer of claim 19, further comprising:
receiving, from the mobile device, a message including restrictions for the use of the first account; and
updating the first account to include the restrictions.

22. The server computer of claim 19, wherein the first transactable access credential includes a first payment account number, and wherein the second transactable access credential includes a second payment account number.

* * * * *